United States Patent [19]
Oeda et al.

[11] Patent Number: 5,408,604
[45] Date of Patent: Apr. 18, 1995

[54] DISPLAY CONTROL INTEGRATED CIRCUIT FOR A DISPLAY HAVING AN INPUT PANEL

[75] Inventors: Shigeto Oeda, Kamakura; Kazuhide Nishiyama, Yokohama; Hiroshi Abei, Yokohama; Toshio Kamimura, Yokohama, all of Japan

[73] Assignee: Hitachi, Ltd., Tokyo, Japan

[21] Appl. No.: 986,480

[22] Filed: Dec. 7, 1992

[30] Foreign Application Priority Data

Dec. 17, 1991 [JP] Japan ................... 3-333570

[51] Int. Cl.[6] .......................... G06F 15/20
[52] U.S. Cl. ......................... 395/162; 382/44
[58] Field of Search ..................... 395/162–164, 395/118, 119, 127, 129; 345/173, 178, 179, 10, 182, 11, 104, 214; 382/13, 44; 178/18

[56] References Cited

U.S. PATENT DOCUMENTS

| | | | |
|---|---|---|---|
| 4,641,354 | 2/1987 | Fukunaga et al. | 382/13 |
| 4,646,073 | 2/1987 | Fununaga et al. | 345/145 |
| 4,680,804 | 7/1987 | Kuzunuki et al. | 382/13 |
| 4,730,186 | 3/1988 | Koga et al. | 345/179 |
| 5,179,638 | 1/1993 | Dawson et al. | 395/127 |

FOREIGN PATENT DOCUMENTS 2-188818  7/1990  Japan ................ G06F 3/03

OTHER PUBLICATIONS

"Hitachi Microcomputer System," User's Manual for HD46505S, CRT Controller (CRTC), published by Hitachi, pp. 7 and 43–45. (Provided in Japanese with explanation of relevance in English).

"Hitachi Microcomputer System," User's Manual for HD63484 ACRTC, Advanced CRT Controller, published by Hitachi, Oct. 1984, p. 46. (Provided in Japanese with explanation of relevance in English).

Primary Examiner—Mark R. Powell
Assistant Examiner—Kee M. Tung
Attorney, Agent, or Firm—Fay, Sharpe, Beall, Fagan, Minnich & McKee

[57] ABSTRACT

An input panel interface section is responsive to an input signal from an input panel to provide input coordinate data indicating an input position in a coordinate system used in the input panel. A converter converts the input coordinate data provided by the input panel interface section into display coordinate data. The display coordinate data is data in a coordinate system used for a display controller to determine a display position on a display. The display controller controls display output to the display by using the display coordinate data output by the coordinate converter. A CPU interface section controls access of a processor to the display controller, the input panel interface section, and the coordinate converter.

17 Claims, 14 Drawing Sheets

FIG.9

HORIZONTAL DISPLAY COORDINATES: ----- 52, 53, 54, 55, 56, 57 -----

VERTICAL DISPLAY COORDINATES: 160, 161, 162, 163

FIG.10

HORIZONTAL DISPLAY COORDINATES: ----- 52, 53, 54, 55, 56, 57, 58 -----

VERTICAL DISPLAY COORDINATES: 160, 161, 162, 163

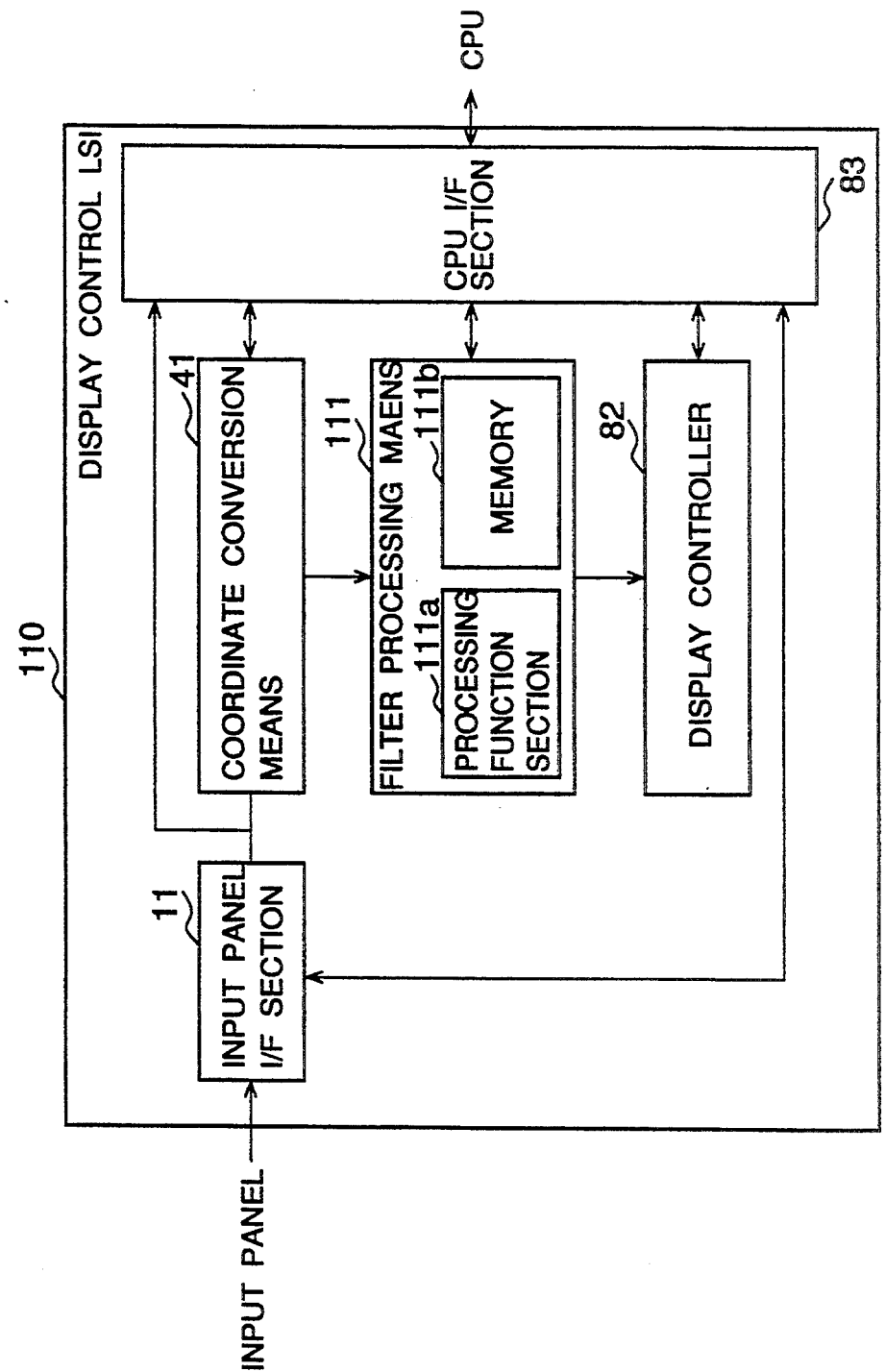

DISPLAY CONTROL INTEGRATED CIRCUIT FOR A DISPLAY HAVING AN INPUT PANEL

BACKGROUND OF THE INVENTION

1. Field of the Invention

This invention relates to a display control integrated circuit (IC) for controlling display output onto a display and more particularly to a display control IC appropriate for display control on a display having an input panel.

2. Description of the Related Art

The art described in Japanese Patent Laid-Open No. Hei 2-188818 is known as a display control IC which controls display output onto a display having an input panel. FIG. 3 shows the configuration of such a conventional information processing apparatus, wherein numeral 20 is an input panel for input of handwriting; numeral 21 is a display such as a liquid crystal display panel; numeral 22 is a display memory which stores display data written by a CPU (central processing unit), etc.,; numeral 23 is a ROM (read-only memory) which stores read-only programs and data; numeral 24 is a RAM (random access memory) where programs and data can be written and read; numeral 25 is a CPU which controls the entire information processing unit; numeral 26 is I/O (input/output) control means for controlling a memory card 27; numeral 27 is a memory card which is removable storage means; numeral 30 is an input panel control LSI (large-scale integrated circuit) such as an analog-to-digital converter which converts input of the input panel 20 into input coordinates; and numeral 31 is a display control LSI which controls display on the display panel 21.

For an information processing apparatus having an input panel as described above, for example, to display an input path at positions on the display overlapping with input positions on the input panel as if the user drew an image directly onto the display screen with an input pen, the CPU reads input coordinate data of the input panel from the input panel control LSI, processes the data to obtain the display coordinates of the points to be displayed on the display, and writes the resultant display data through the display control LSI into the addresses of the display memory corresponding to the display coordinates.

Thus, according to the conventional art, both display control and input panel control LSIs are provided and the CPU controls them separately.

Recently, however, a portable information processing apparatus has been desired and to meet this demand, a small device which consumes low power is required. According to the above-mentioned conventional art, the CPU must perform display control in response to input coordinate data output by the input panel control LSI and may accordingly cause overload.

SUMMARY OF THE INVENTION

Therefore, it is an object of the invention to enable an information processing apparatus having a display and an input panel to consume low power and be miniaturized.

Another object of the invention is to reduce CPU load for display control processing in an information processing apparatus having a display and an input panel.

To these ends, according to the invention, there is provided a display control IC which comprises a display controller which controls display output onto a display, an input panel interface responsive to an input signal from an input panel for providing input coordinate data indicating the input position in a coordinate system used in the input panel, and a CPU interface for controlling an access of the CPU to the display controller and the input panel interface.

The display control IC may further include coordinate conversion means for converting the input coordinate data provided by the input panel interface into display coordinate data which is data in a coordinate system used for the display controller to determine a display position on the display wherein the CPU interface controls an access of the CPU to the display controller, the input panel interface, and the coordinate conversion means. The display control IC may further include coordinate conversion means for converting the input coordinate data provided by the input panel interface into display coordinate data which is data in a coordinate system used for the display controller to determine a display position on the display wherein the display controller displays an image including characters on the display by using the display coordinate data output by the coordinate conversion means. The display control IC may further include coordinate conversion means for converting the input coordinate data provided by the input panel interface into display coordinate data which is data in a coordinate system used for the display controller to determine a display position on the display and filtering means for applying filtering processing to the display coordinate data output by the coordinate conversion means wherein the display controller displays an image including characters on the display by using the resultant display coordinate data to which filtering processing has been applied by the filtering processing means.

The display control IC may further include recognition means responsive to the input coordinate data provided by the input panel interface for recognizing a character input to the input panel and outputting recognition data indicating the recognized character, the display controller being responsive to the recognition data output by the recognition means for displaying the character indicated by the recognition data on the display. The display control IC may further include recognition means responsive to the input coordinate data provided by the input panel interface for recognizing a stroke of a drawn line input to the input panel and outputting recognition data indicating the recognized stroke class, the display controller being responsive to the recognition data output by the recognition means for displaying on the display the drawn line having the stroke of the class indicated by the recognition data.

Preferably, the display control IC further includes interrupt control means responsive to the input coordinate data provided by the input panel interface for determining whether or not the input contents to the input panel satisfy a predetermined condition, the interrupt control means issuing an interrupt signal to the processor if the predetermined condition is satisfied.

An external display controller may also be provided to form an input panel control IC.

With the display control IC according to the invention, the CPU interface controls an access of the CPU to the display controller and the input panel interface, whereby the display controller and the input panel interface can be contained in a single IC to enable the device to be miniaturized and consume low power.

The coordinate conversion means converts the input coordinate data provided by the input panel interface into display coordinate data which is data in a coordinate system used for the display controller to determine the display position on the display, whereby CPU processing load for display control can be relieved and the CPU can access both the input panel interface and coordinate conversion means through the CPU interface for using any desired coordinate data according to whatever processing it is necessary to perform.

If the coordinate conversion means converts the input coordinate data provided by the input panel interface into display coordinate data which is data in a coordinate system used for the display controller to determine the display position on the display and the display controller displays an image including characters on the display by using the display coordinate data output by the coordinate conversion means, the need for the CPU to control display can be eliminated for display at high speed.

If filtering processing means is further provided and the display controller displays an image including characters on the display by using the resultant display coordinate data to which filtering processing has been applied by the filtering processing means, a finer input path can be displayed. If recognition means is further provided and the display controller is responsive to recognition data such as a character code or stroke class output by the recognition means for displaying the contents indicated by the recognition data on the display, finer display can be made, and additionally if the recognition data can be accessed from an external device, the CPU can use the recognition result indicated by the recognition data when performing processing, and processing load is relieved.

If there is provided interrupt control means responsive to the input coordinate data provided by the input panel interface for determining whether or not the input contents to the input panel satisfy a predetermined condition, the interrupt control means issuing an interrupt signal to the processor if the predetermined condition is satisfied, the CPU need not monitor specific conditions related to input for relieving processing load.

BRIEF DESCRIPTION OF THE DRAWINGS

In the accompanying drawings:

FIG. 9 is an illustration showing interpolation processing according to the fifth embodiment of the invention;

FIG. 10 is an illustration showing smoothing processing according to the fifth embodiment of the invention;

FIG. 11 shows the configuration of a display control LSI according to a sixth embodiment of the invention;

DETAILED DESCRIPTION OF THE PREFERRED EMBODIMENTS

Figure 1:
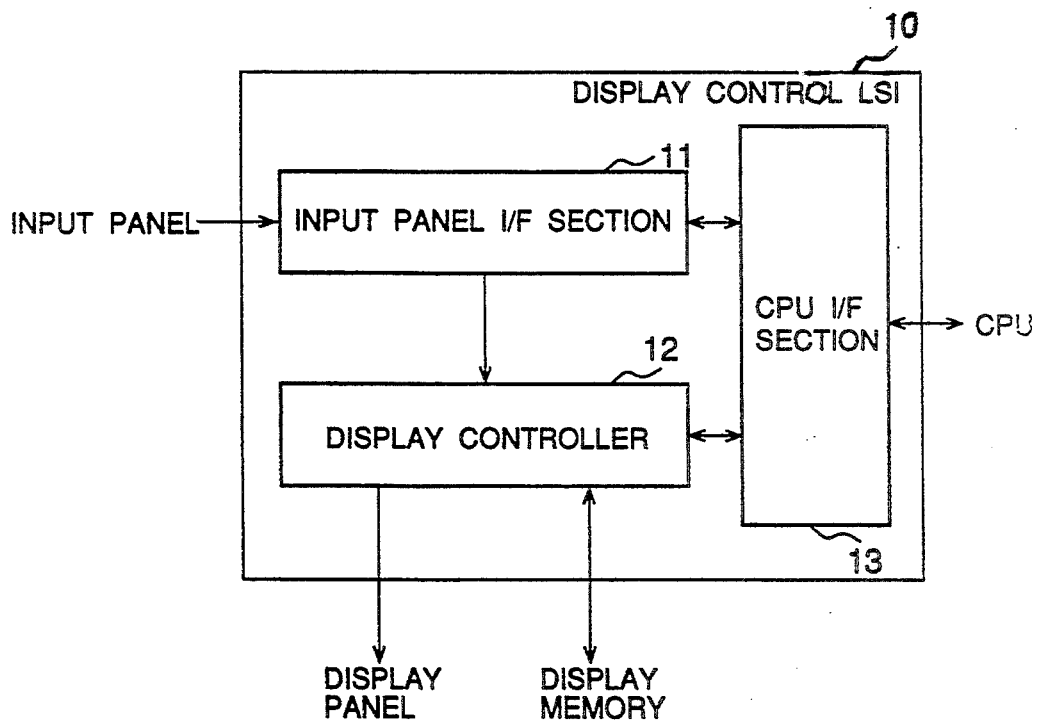
FIG. 1 shows the configuration of a display control LSI according to a first embodiment of the invention.

Referring now to the drawings, there is shown an embodiment of an information processing apparatus according to the invention.

Figure 16:
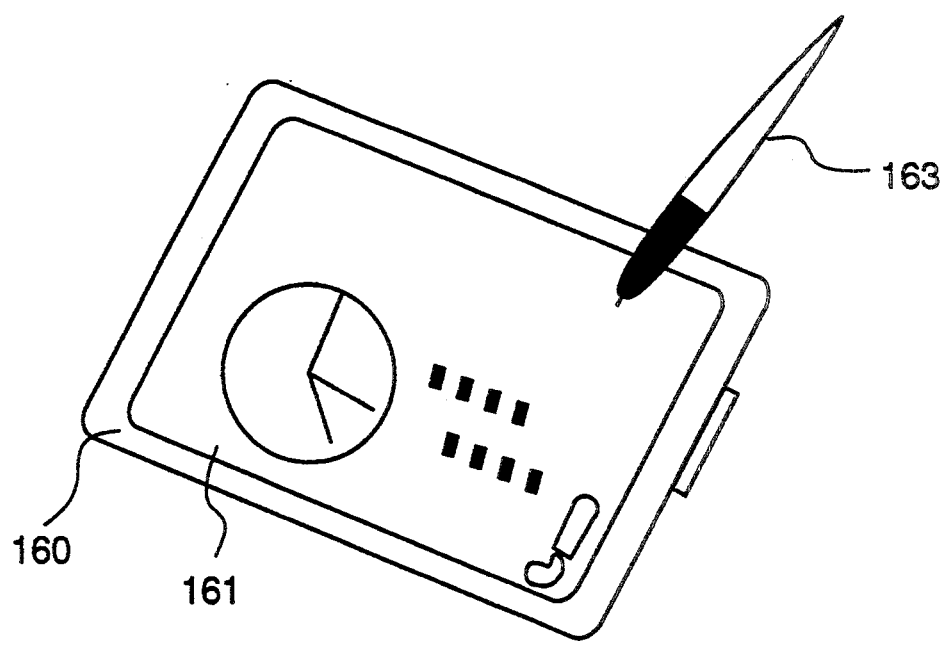
FIG. 16 is a perspective view of an information processing apparatus according to an embodiment of the invention.

First, FIG. 16 shows an external view of the information processing apparatus according to the embodiment.

As illustrated here, the information processing apparatus according to the invention has an input panel 161 integral with a display 160 and enables the user to enter characters, graphics, etc., on the display screen with an input pen 163.

Next, an input display control LSI according to the embodiment is described.

The display control LSI according to the embodiment controls display on the display 160 and the input panel 161 in the information processing apparatus shown in FIG. 16.

FIG. 1 shows the configuration of a display control LSI according to a first embodiment of the invention, wherein numeral 10 is the display control LSI and numeral 11 is an input panel I/F (interface) section. For example, if the input panel outputs analog signals, such as an analog resistor film system, the input panel I/F section 11 is made up of an analog-to-digital converter which converts the analog output into digital input coordinate values, a decoder, etc.

Numeral 12 is a display controller which controls a display such as a CRT or a liquid crystal display panel and a display memory. That is, the display controller 12 sequentially reads data stored by a CPU in the display memory and outputs the data onto the display conforming to the signal specifications required by the display; the controller 12 also controls CPU access to the display memory.

Numeral 13 is a CPU I/F section which controls the CPU accessing the input panel I/F section 11 and the display controller 12. The CPU I/F section 13 normally monitors address commands output by the CPU and in response to an address command given to the display controller or input panel I/F section, causes the display controller or input panel I/F section to perform predetermined operation.

Figure 2:
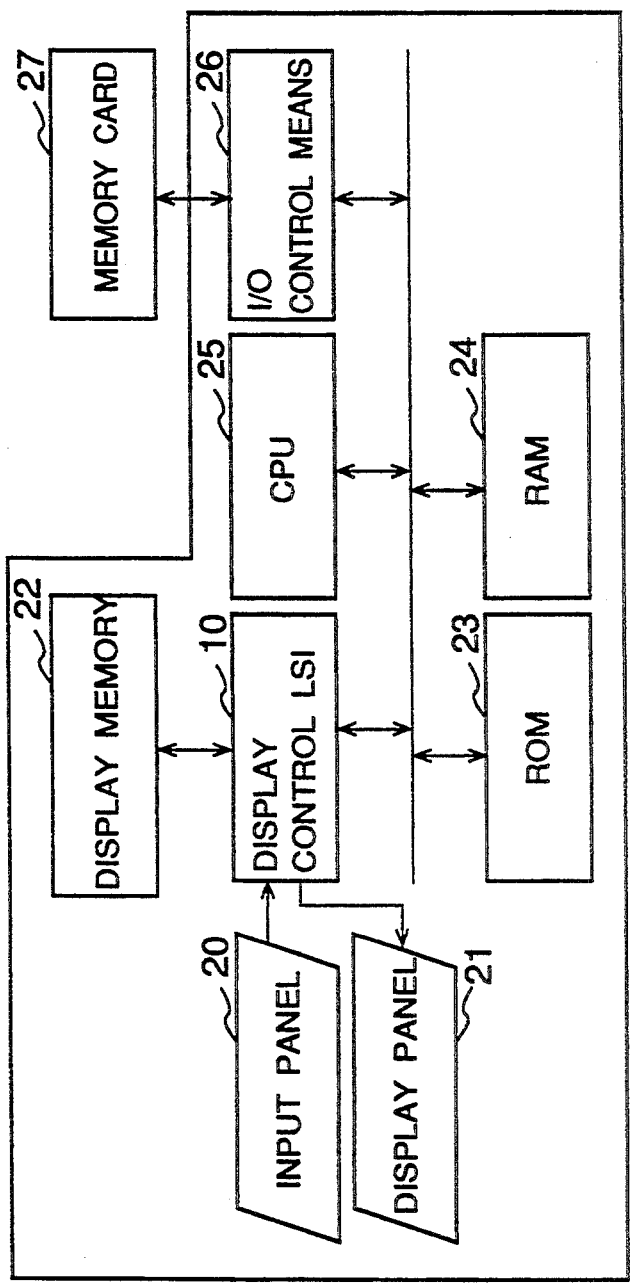
FIG. 2 shows the configuration of an information processing unit according to the first embodiment of the invention.
Figure 3:
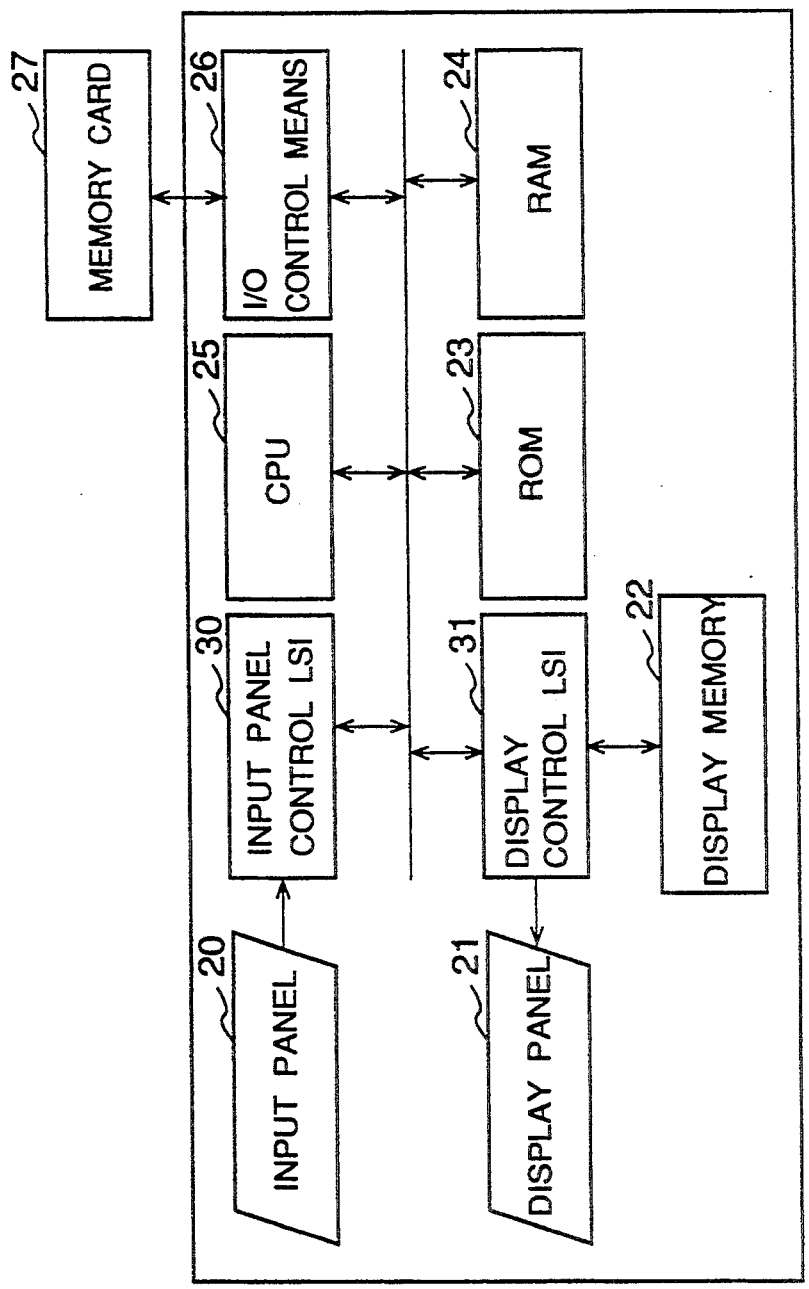
FIG. 3 shows the configuration of a conventional information processing apparatus.

Next, FIG. 2 shows the configuration of an information processing apparatus using the display control LSI according to the first embodiment of the invention.

In FIG. 2, numeral 20 is an input panel for input of handwriting; numeral 21 is a display such as a liquid crystal display panel; numeral 22 is a display memory which stores display data written by a CPU (central processing unit), etc.,; numeral 23 is a ROM (read-only memory) which stores read-only programs and data; numeral 24 is a RAM (random access memory) where programs and data can be written and read; numeral 25 is a CPU which controls the entire information processing apparatus; numeral 26 is I/O (input/output) control means for controlling a memory card 27; numeral 27 is a memory card which is removable storage means.

Mainly, handwriting is input to the information processing apparatus through the input panel 20. The input data is converted into input coordinate data by the input panel I/F section 11 in the display control LSI 10. The CPU 25 occasionally accesses the display control LSI to read the input coordinate data.

When the input coordinate data is processed and it is necessary to change display data for moving the input path, etc., the CPU 25 determines what is to be displayed and writes the corresponding display coordinate data into the display memory. If the display controller 12 in the display control LSI 10 is provided with a drawing function such as drawing lines and curves, the CPU can also control the display control LSI 10 to directly change display, etc.

The CPU 25 accesses the display control LSI 10 with respect to two types of operation of reading the input panel and changing display data. The access is directed to the input panel I/F section 11 or the display controller 12 under the control of the CPU I/F section 13 in the display control LSI 10.

Thus, according to the first embodiment, the input panel 20 and the display panel 21 can be controlled by one display control LSI 10 to provide a small information processing apparatus which consumes low power. This enables an information processing apparatus to be miniaturized, consume low power, and to be manufactured at low cost. Further, separate CPU I/F sections formerly required for a display controller and an input I/F section can be combined into a common interface.

The first embodiment is also applicable to an information processing apparatus where a display and an input panel are not integrally housed.

An information processing apparatus having an input panel as described above is normally responsive to input from the input panel to display the input contents on the display. The information processing apparatus according to the embodiment displays the input contents at positions on the display overlapping with input positions on the input panel as if the user had drawn an image directly on the display screen with an input pen.

Generally, however, the input coordinate scale used with the input panel is smaller than the display coordinate scale used with the display. Therefore, to display on the display panel a path of handwriting entered on the input panel, the CPU must read the input coordinates, convert the coordinates into the display coordinates output to the display, and write the resultant display coordinates into the display memory, as described above. The CPU recognizes the input contents in response to the input coordinates and executes predetermined processing in response to the recognition contents.

Figure 4:
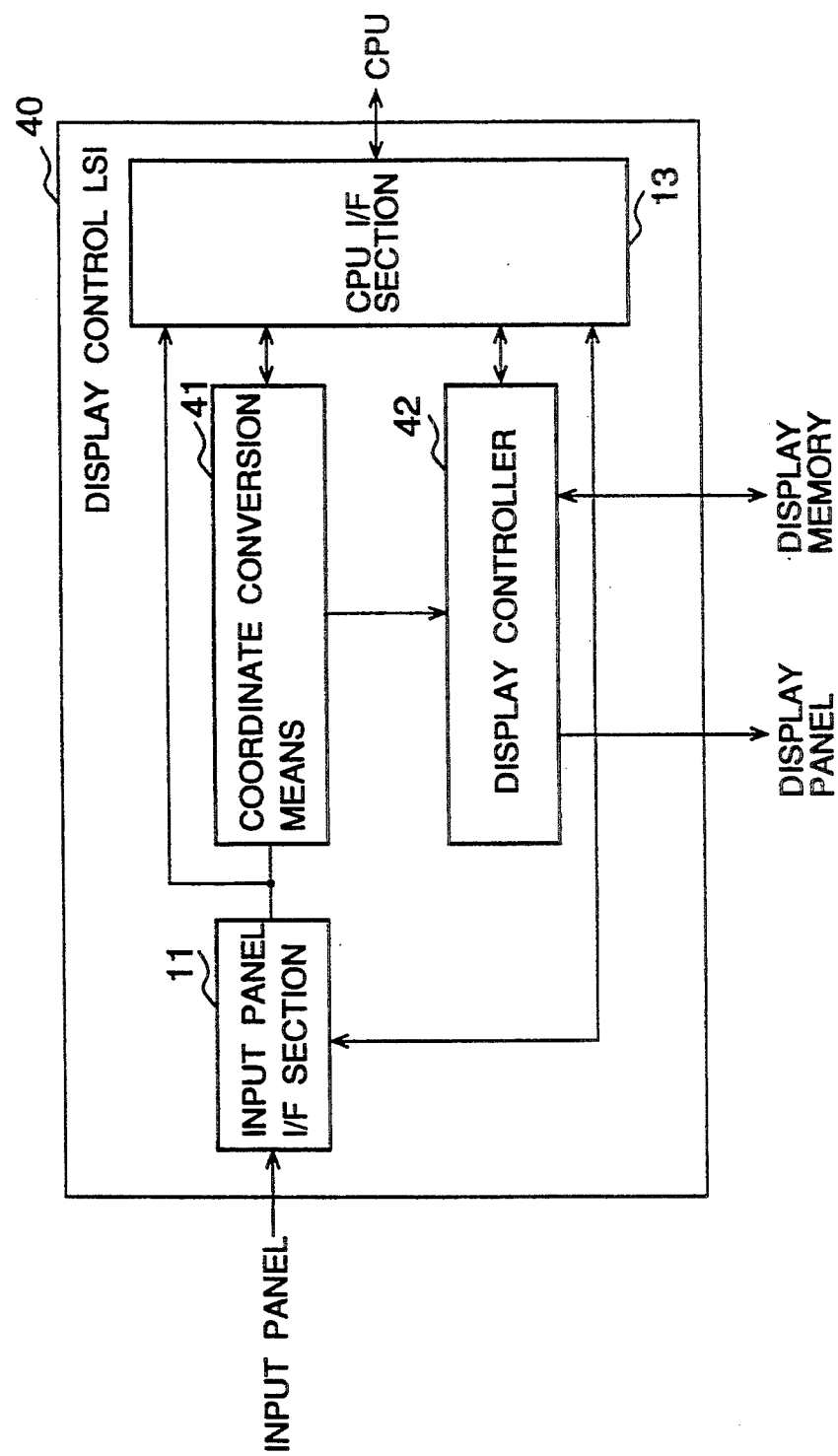
FIG. 4 shows the configuration of a display control LSI according to a second embodiment of the invention.

Next, FIG. 4 shows the configuration of a display control LSI according to a second embodiment of the invention.

In FIG. 4, numeral 41 is coordinate conversion means for converting input coordinates which are input panel coordinates into display coordinates which are display panel coordinates or display work area coordinates on memory and numeral 42 is a display controller which can perform drawing processing such as drawing of an input path of handwriting in response to the display coordinates output by the coordinate conversion means 41.

The display control LSI 40 according to the second embodiment includes the coordinate conversion means 41 for coordinate conversion processing performed by the CPU in the first embodiment. It also sends the input coordinates intact to the CPU, for processing such as character recognition.

Figure 5:
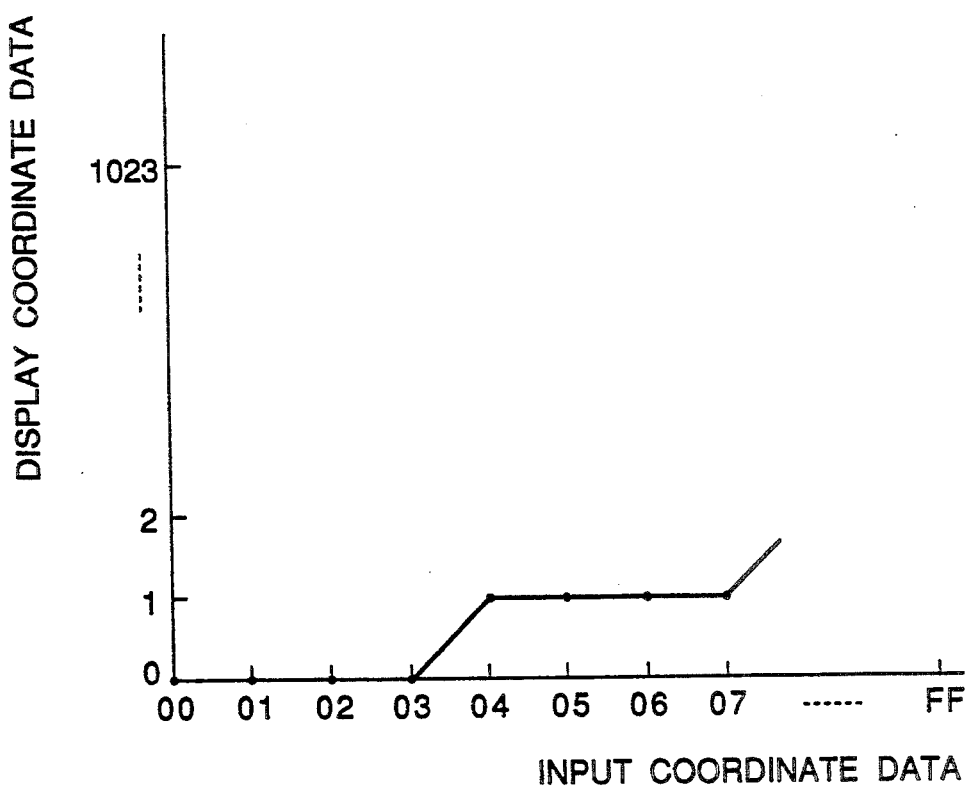
FIG. 5 is an illustration showing coordinate conversion rules according to the second embodiment of the invention.

FIG. 5 shows the conversion rule from input coordinate data into display coordinate data. As illustrated, scale conversion from input coordinates to display coordinates is enabled according to the rule.

The operation of the display control LSI according to the second embodiment will now be described.

In FIG. 4, input from an input panel 20 is converted into input coordinate data by an input panel I/F section 11 in the display control LSI 40 for feeding into the coordinate conversion means 41. The coordinate conversion means 41 consists of a ROM, etc., and converts the input coordinate data into display coordinates according to the correspondence table shown in FIG. 5.

For example, input coordinates (0, 0FFH) are converted into display coordinates (0, 1023). In the second embodiment, the resultant display coordinate data is fed into a CPU I/F section 13 to enable an access from a CPU 25. In addition, the resultant display coordinate data is fed into a display controller 42.

The display controller 42 has a drawing function of drawing specific display data in a specific area containing any desired display coordinate positions and draws specific display data at the display coordinate positions entered by using the drawing function. This enables an input path of handwriting, etc., to be displayed on a display 21 without intervention of the CPU 25. Thus, the processing overhead is reduced and the input path can be displayed at high speed. Further, CPU processing load can be relieved. On the other hand, the CPU can access both input coordinate data before conversion and display coordinate data into which input coordinates have been converted. Therefore, the CPU can selectively use either the input or display coordinate data in response to what recognition processing is to be performed for the input contents. When characters are entered through the input panel and the CPU recognizes the entered characters as a part of processing, preferably more detailed input information than the display contents is provided for character recognition. In such a case, the CPU is enabled to access the input coordinate data before conversion.

The function widely used as the drawing function of a personal computer is known for the drawing function of the display controller. Although an input path is drawn in the embodiment, a cursor may also be drawn for display of input positions, modes, etc.

Although the coordinate conversion means 41 is comprised of a ROM in the embodiment, coordinate conversion processing may also be put into logical expressions to provide the coordinate conversion means by hardware logic or by software logic by means of utilizing the CPU function. Although the display controller is provided with the drawing function in the embodiment, it may also be provided simply with a setting function of data in a display memory.

Figure 6:
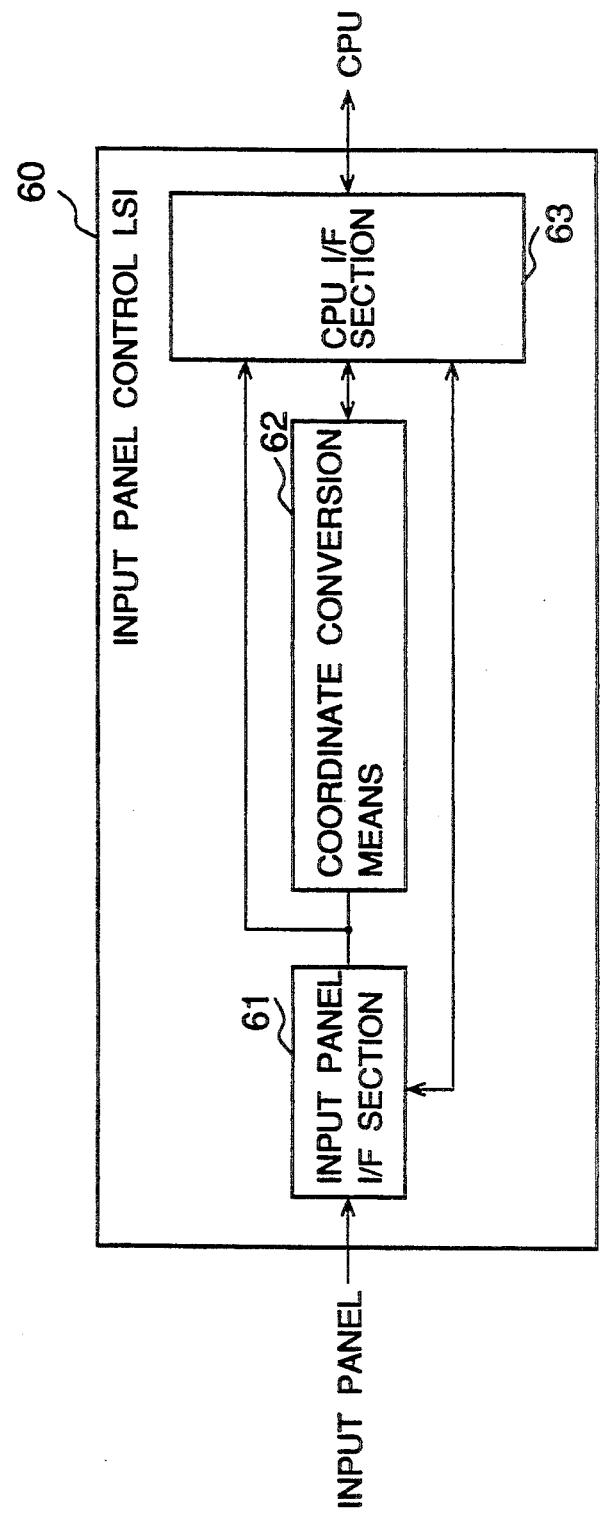
FIG. 6 shows the configuration of an input panel control LSI according to a third embodiment of the invention.

Next, FIG. 6 shows the configuration of an input panel control LSI according to a third embodiment of the invention.

In FIG. 6, numeral 60 is an input panel control LSI of the invention, numeral 61 is an input panel I/F section which converts input of an input panel 20 into input coordinates, and numeral 62 is coordinate conversion means for converting the input coordinates into display coordinates. The input panel I/F section 61 and the input coordinate conversion means 62 in FIG. 6 have equivalent functions to those of the input panel I/F section 11 and the input coordinate conversion means 41 according to the second embodiment shown above in FIG. 4.

In an information processing apparatus having an input panel control LSI as described above, the CPU accesses the input panel control LSI in order to detect an input change of the input panel at predetermined timing. This eliminates the need for the CPU to execute coordinate conversion for display described above, thereby relieving CPU processing load.

Figure 7:
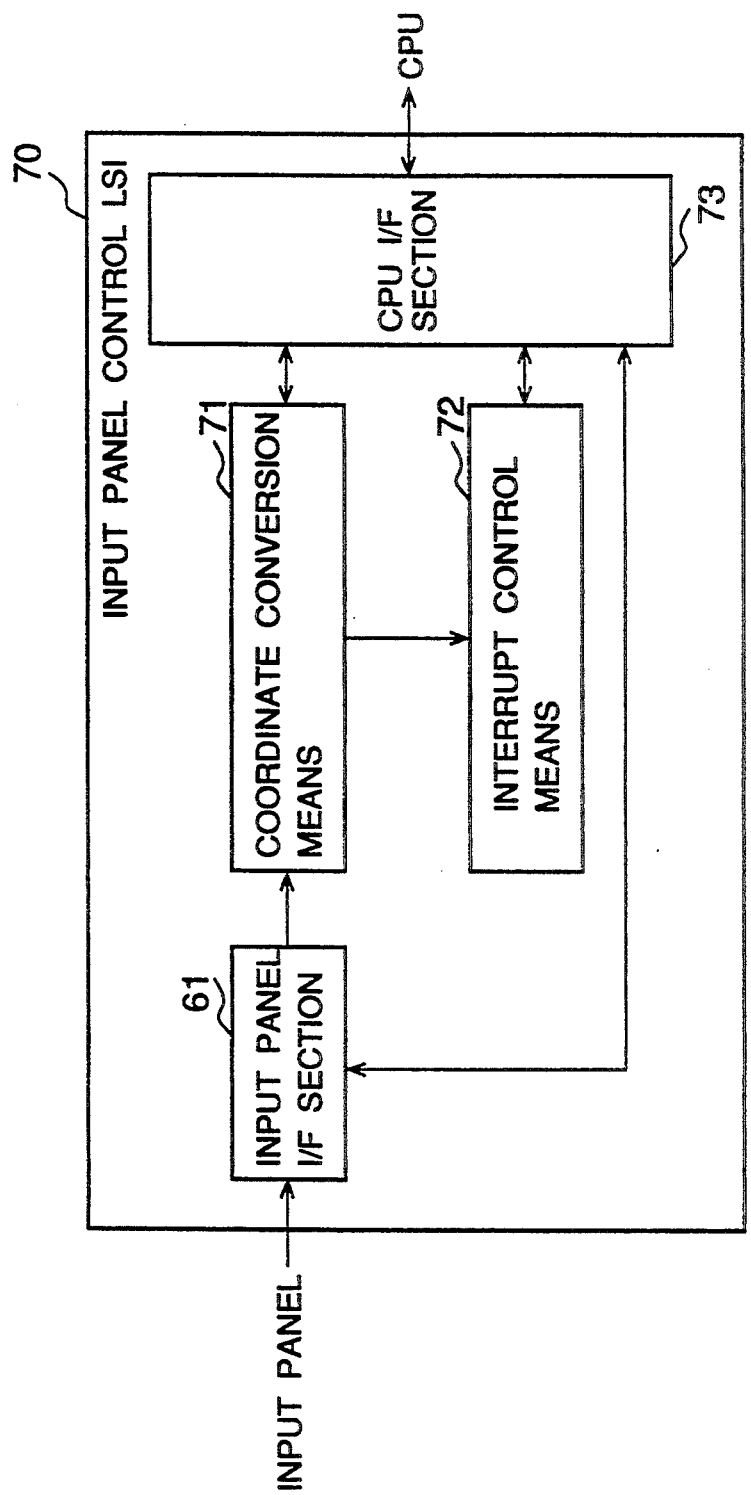
FIG. 7 shows the configuration of an input panel control LSI according to a fourth embodiment of the invention.

Next, FIG. 7 shows the configuration of an input panel control LSI according to a fourth embodiment of the invention.

In FIG. 7, numeral 70 is an input panel control LSI, numeral 71 is coordinate conversion means for converting input coordinates into display coordinates, numeral 72 is interrupt control means for generating an interrupt signal when display coordinate data output by the coordinate conversion means 71 satisfies a predetermined condition, and numeral 73 is a CPU I/F section. The coordinate conversion means 71 has an equivalent function to that of the coordinate conversion means 41 according to the second embodiment shown above in FIG. 4.

The interrupt controller 72 generates an interrupt signal for a CPU when a specific interrupt condition occurs such that display coordinate data matches specific coordinates, exits or enters a specific coordinate area, or changes more than a specific coordinate amount. The CPU sets such interrupt generation conditions in the interrupt control means 72 in the input panel control LSI as processing requires.

The interrupt control means 72 monitors display coordinates output by the coordinate conversion means 71, and when one of the setup interrupt generation conditions described above occurs, generates an interrupt signal to indicate to the CPU that an interrupt has occurred. When receiving the interrupt signal, the CPU accesses the coordinate conversion means 71 through the CPU I/F section and obtains the display coordinates into which input coordinates have been converted.

Thus, according to the fourth embodiment, the CPU need not periodically access the input panel control LSI to check whether or not a specific condition such as a change in display coordinates occurs, thereby relieving CPU load.

Although in the fourth embodiment, the interrupt control means 72 monitors display coordinates output by the coordinate conversion means 71, the interrupt control means 72 may also monitor input coordinates output by the input panel I/F section 61 or both the display and input coordinates.

Figure 8:
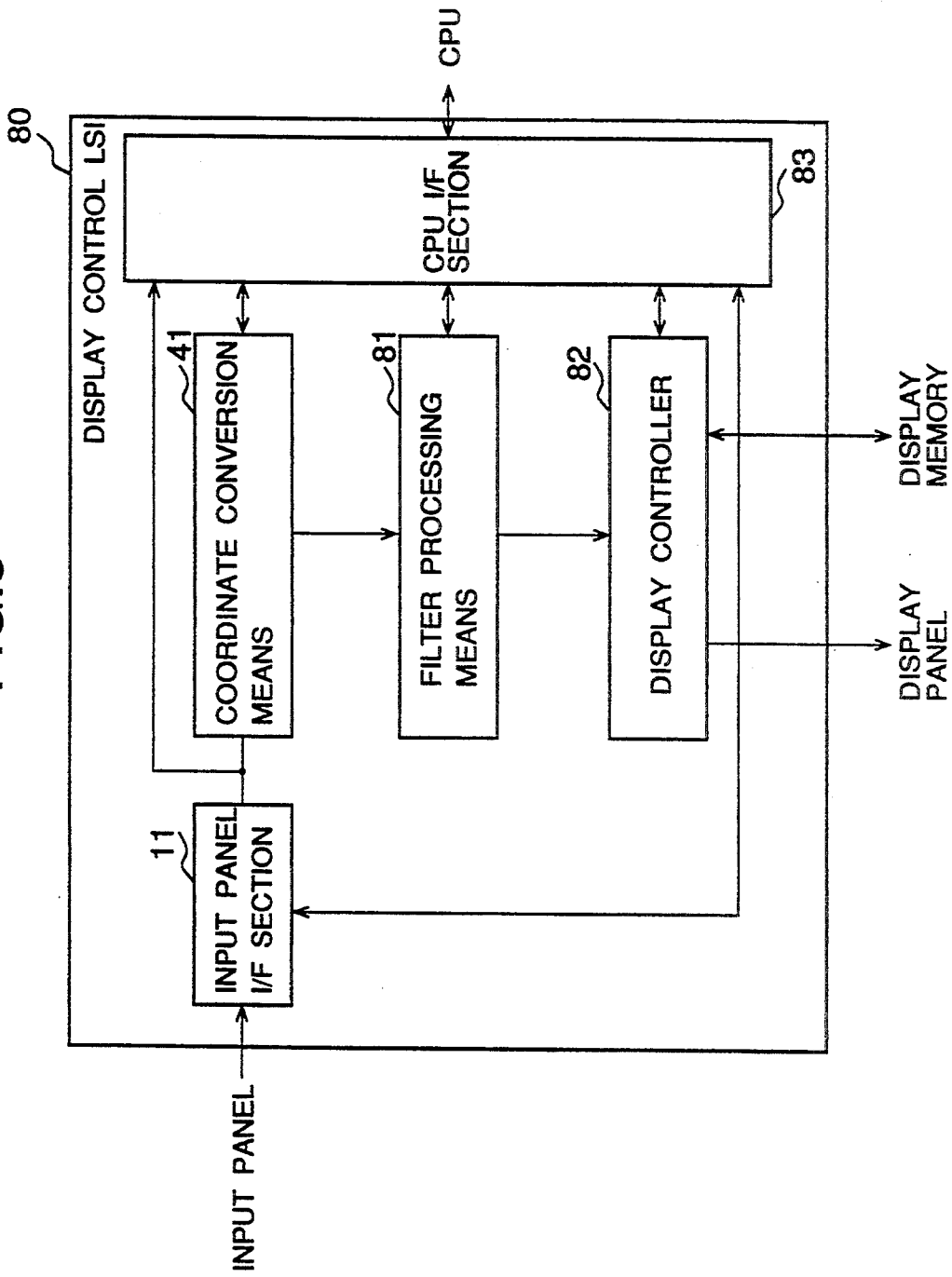
FIG. 8 shows the configuration of a display control LSI according to a fifth embodiment of the invention.

Next, FIG. 8 shows the configuration of a display control LSI according to a fifth embodiment of the invention.

In FIG. 8, numeral 80 is a display control LSI, numeral 81 is filter processing means for performing filtering processing such as interpolation and smoothing of display coordinate data, and numeral 82 is a display controller which has a function of displaying corrected display coordinate data output by the filter processing means 81 in addition to a display control function equivalent to that of the display controller according to the first embodiment shown above in FIG. 1.

In such a configuration, input from an input panel is converted into input coordinate data by input panel I/F section 11. The input coordinate data is converted into display coordinate data by coordinate conversion means 41 for feeding into the filter processing means 81.

The operation of the filter processing means 81 will now be described with reference to FIGS. 9 and 10.

The filter processing means 81 performs filtering processing such as interpolation and smoothing. When input of handwriting to the input panel or the like is discrete (a set of separate points rather than a line) in input or display coordinates, the interpolation processing is to convert it into a straight line or a curve connecting the separate points so that display of the input path or the like becomes visible and operability is improved. When the changes in a continuous input sampling point group or display coordinates exceed a predetermined change amount, the smoothing function corrects the change in the change suppression direction or masks an input change not intended by the user, such as an accidental hand jerk.

FIG. 9 is an illustration showing an interpolation processing example, wherein display coordinate data is three points (52, 162), (54, 160), and (56, 160). Since the display coordinate data is not continuous, the filter processing means 81 adds points (53, 161) and (55, 160) as display coordinate data. The interpolation processing is an art widely used for correction of display data, etc., and will therefore not be discussed in detail here.

FIG. 10 is an illustration showing a smoothing processing example, wherein display coordinate data is five points (52, 161), (53, 161), (54, 163), (55, 161), and (56, 161). The filter processing means 81 smooths the display coordinate data to correct the display coordinate data (54, 163) to (54, 161). The smoothing processing is an art widely used for correction of display data, etc., and will therefore not be discussed in detail here.

The filter processing means 81 performs filtering processing such as interpolation processing and smoothing processing as described above. The corrected display coordinate data for which filtering processing has been performed can be accessed via a CPU I/F section 13 from an external CPU, and the data is fed into the display controller 82.

The display controller 82 has a drawing function of drawing specific display data in a specific area containing any desired display coordinate positions and draws specific display data at the display coordinate positions entered by using the drawing function.

This enables an input path of handwriting, etc., to be displayed without intervention of the CPU, thereby relieving CPU processing load and reducing the overhead of processing such as data transfer to and from the CPU. Thus, the input path can be displayed at high speed.

Although the display controller is provided with the drawing function in the fifth embodiment, it may also be provided simply with a function of setting data in a display memory. Although display coordinate data is fed into the filter processing means 81 in the embodiment, input coordinate data may also be fed into the filter processing means 81 for coordinate conversion of the data for which filter processing has been performed. Also, an input panel control LSI may be made up of only the input panel I/F section 11, the coordinate conversion means 41, and the filter processing means 81.

Next, FIG. 11 shows the configuration of a display control LSI according to a sixth embodiment of the invention.

In FIG. 11, numeral 110 is a display control LSI, numeral 111 is filter processing means, numeral 111a is a processing function section which executes filter processing, and numeral 111b is a memory.

In the sixth embodiment, the filter processing means 111 is responsive to a program stored in the memory 111b for executing filtering processing by the processing function section 111a. By making the filtering processing programmable, the operation and algorithm can be changed for improving operability.

Although the processing function section performs only processing of the filter processing means in the sixth embodiment, the processing function section may also execute other processing such as processing of coordinate conversion means 41. Although the memory 111b is located in the display control LSI, an external memory may also be provided instead of the memory 111b. Although the display controller is provided with the drawing function, it may also be provided simply with a function of setting data in a display memory. Although display coordinate data is fed into the filter processing means 111, input coordinate data may also be fed into the filter processing means 111 for coordinate conversion after filter processing is performed. Also, an input panel control LSI may be made up of only an input panel I/F section 11, the coordinate conversion means 41, and the filter processing means 111.

Figure 12:
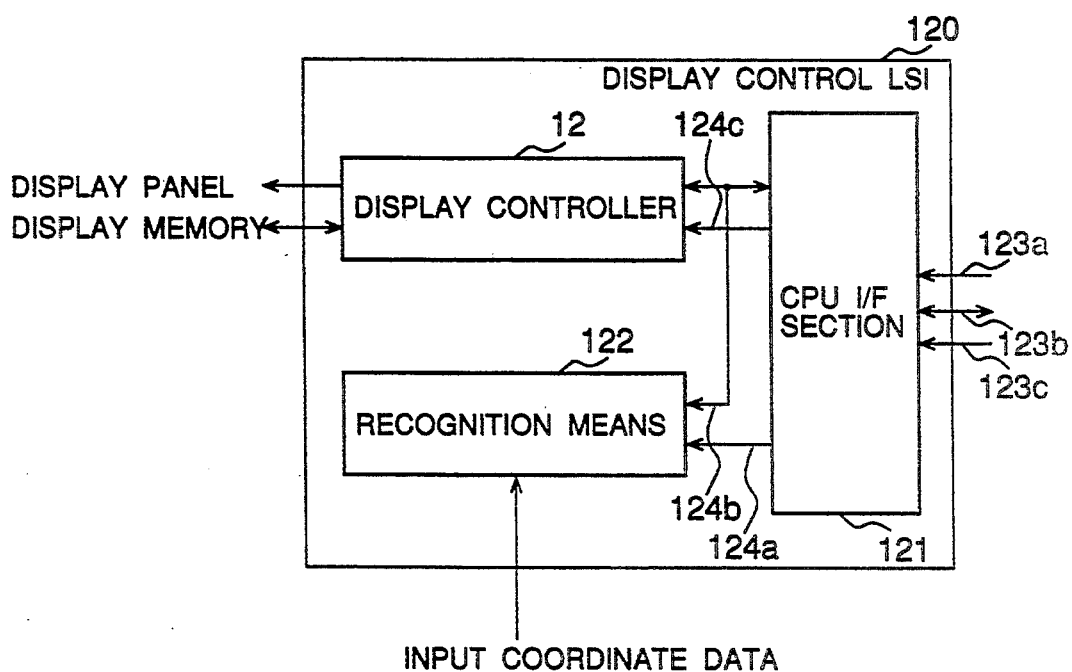
FIG. 12 shows the configuration of a display control LSI according to a seventh embodiment of the invention.

Next, FIG. 12 shows the configuration of a display control LSI according to a seventh embodiment of the invention.

In FIG. 12, numeral 120 is a display control LSI, numeral 121 is a CPU I/F section which controls a display controller 12 and recognition means 122, and numeral 122 is recognition means for converting input coordinate data into a character code or stroke class. The recognition means 122 has a CPU function and executes recognition processing in response to a program down loaded via the CPU I/F section 121 from an external system. The art of recognizing input coordinate data is widely used with information processing systems, and will therefore not be discussed in detail here.

Numerals 123a to 123c are signal lines connecting the CPU I/F section 121 and external control means such as a CPU; numeral 123a is an address line for inputting an address signal, numeral 123b is a data line for inputting-/outputting a data signal, and numeral 123c is a control line for a read/write, etc. Numerals 124a to 124c are internal signal lines connecting the CPU I/F section 121, the display controller 12, and the recognition means 122; numeral 124a is a selection line 1 for selecting the recognition means 122, numeral 124b is an internal signal line for a data signal, control signal, etc., and numeral 124c is a selection line 2 for selecting the display controller 12. The display controller 12 and the recognition means 122 are assigned different addresses.

In such a configuration, information of handwriting, etc., entered through an input panel is converted into input coordinate data by an external input panel control LSI and the resultant input coordinate data is fed into the display control LSI 120. The recognition means 122 executes recognition processing based on previously stored dictionary information, etc., and stores the result as character code. When the CPU which controls the entire information processing apparatus accesses the display control LSI in order to obtain the recognition result, the CPU I/F section 121 is responsive to the address output by the CPU for signaling the recognition means on the internal signal line 124 and responding to the CPU with information such as the recognition result on the data line 123b. When the CPU accesses the display control LSI in order to change display data, the CPU I/F section is also responsive to the address output by the CPU for signaling the display controller 12 on the internal signal line 124.

Thus, the CPU I/F section determines which of the display controller 12 and the recognition means 122 the CPU accesses whereby the display controller and recognition means can be contained in a single LSI to miniaturize the information processing apparatus and CPU processing load for character recognition can be relieved.

Although input coordinate data is fed into the recognition means 122 in the seventh embodiment, display coordinate data into which the input coordinate data has been converted may also be fed into the recognition means 122 for recognition. A program is loaded into the recognition means 122 from an external system, but may also be previously stored in the recognition means 122 by fixed means such as firmware. The recognition means 122 contains the CPU function and executes predetermined recognition operation in response to the program, but may also be provided by hardware logic. The recognition means 122 outputs the recognition result as character code, but may also output it as stroke class.

Figure 13:
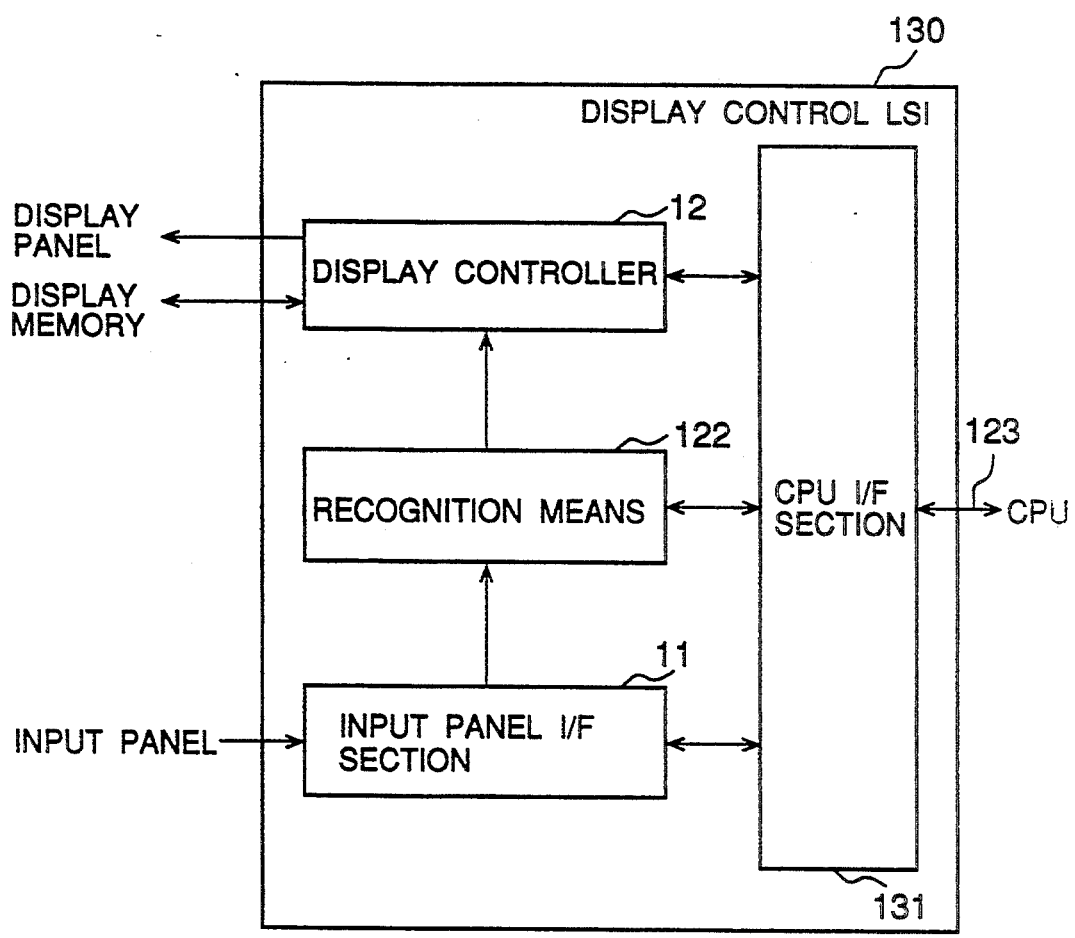
FIG. 13 shows the configuration of a display control LSI according to an eighth embodiment of the invention.

Next, FIG. 13 shows the configuration of a display control LSI according to an eighth embodiment of the invention.

In FIG. 13, numeral 130 is a display control LSI and numeral 131 is a CPU I/F section.

In such a configuration, input from an input panel is converted into input coordinate data by an input panel I/F section 11 for feeding into recognition means 122. The recognition means 122 recognizes the input coordinate data based on data such as dictionary information and stores the recognition result as character code. As with the display control LSI according to the seventh embodiment described above, the CPU I/F section 131 is responsive to an address received from a CPU for controlling an access to a display controller 12, the recognition means 122, and the input panel I/F section 11. This enables the display controller 12, the recognition means 122, and the input panel I/F section 11 to be contained in a single LSI for low power consumption and miniaturization.

Figure 14:
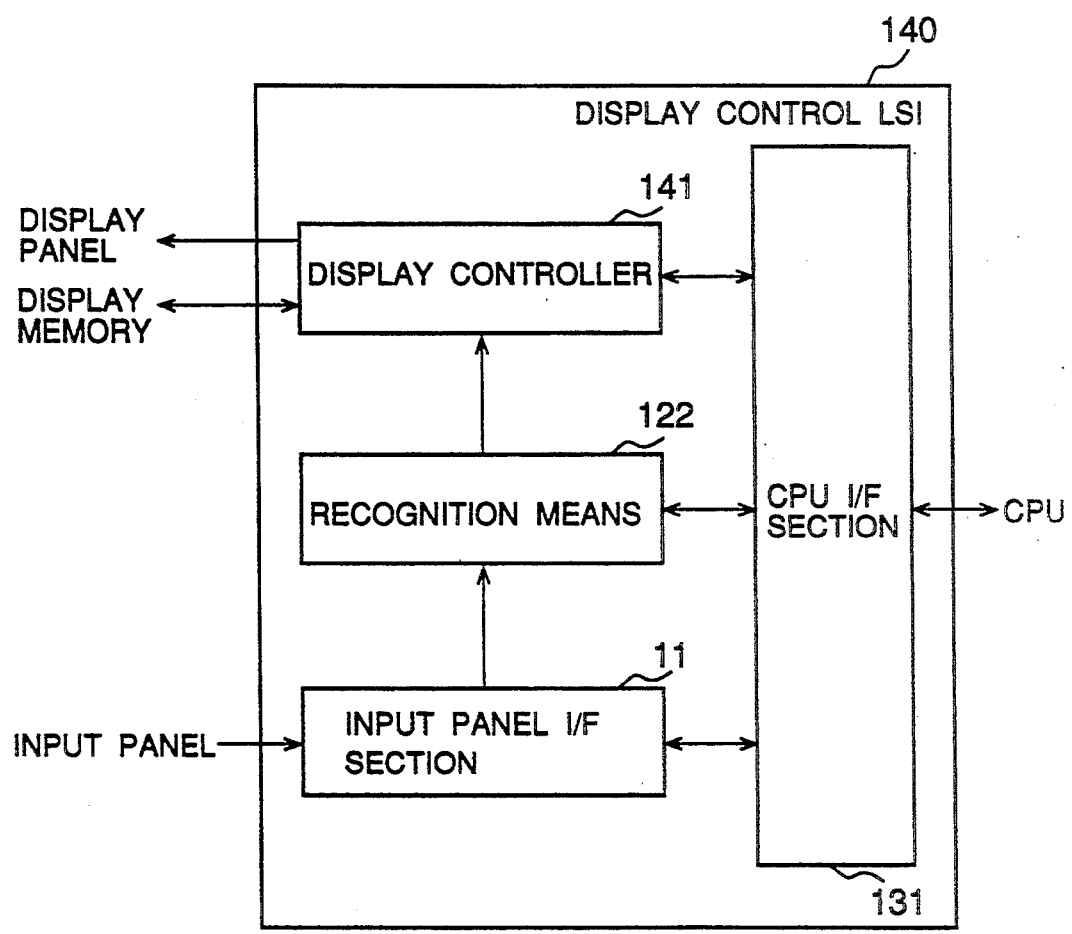
FIG. 14 shows the configuration of a display control LSI according to a ninth embodiment of the invention.

Next, FIG. 14 shows the configuration of a display control LSI according to a ninth embodiment of the invention.

In FIG. 14, numeral 140 is a display control LSI and numeral 141 is a display controller.

In such a configuration, input from an input panel is converted into input coordinate data by an input panel I/F section 11 for feeding into recognition means 122. The recognition means 122 recognizes the input coordinate data based on previously stored dictionary information and outputs a character code to the display controller 141. In response to this character code, the display controller retrieves character data which is character form data from external storage means through a CPU I/F section 131 for display. The character code output by the recognition means 122 can be accessed by a CPU through the CPU I/F section; the CPU retrieves the character code as necessary and performs predetermined processing.

Therefore, according to the ninth embodiment, input, recognition, and display processing can be performed within the display control LSI at high speed and CPU load can be relieved.

The display controller processes all output of the recognition means in the ninth embodiment, but may also share processing with the CPU. Character data is retrieved from external storage means, but may also be stored in the display control LSI. Although the recognition means outputs a character code, the recognition means may also output a stroke class to the display controller which then draws a straight line or curve corresponding to the stroke class. Although the display controller is responsive to the recognition result of the recognition means for drawing, the controller may also have coordinate conversion means for converting input coordinate data output by the input panel I/F section into display coordinate data and drawing based on the display coordinate data.

The arts of writing a character code into a text display memory for display, of identifying character data from a character code and writing it into a display memory, and of drawing a straight line and a curve from stroke information are widely used, and will therefore not be discussed in detail here.

Figure 15:
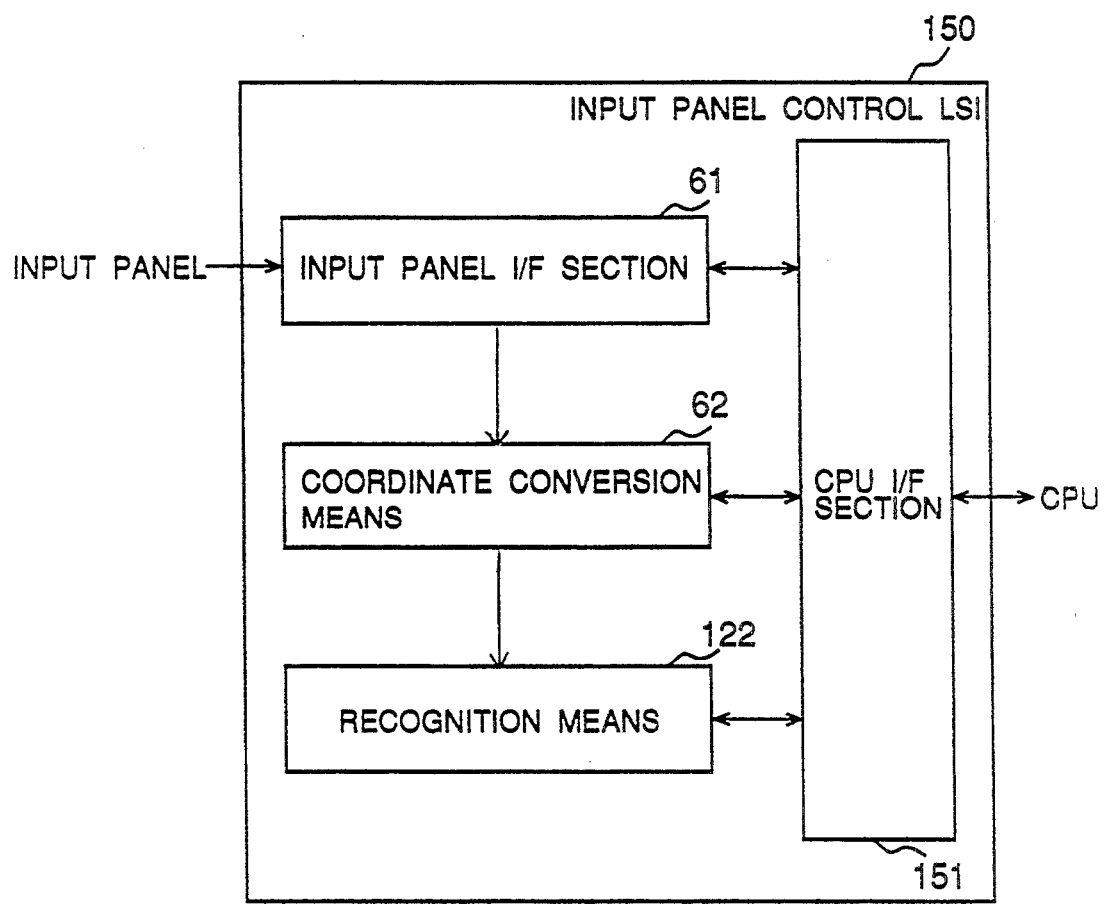
FIG. 15 shows the configuration of an input panel control LSI according to a tenth embodiment of the invention.

Next, FIG. 15 shows the configuration of an input panel control LSI according to a tenth embodiment of the invention.

In FIG. 15, numeral 150 is an input panel control LSI and numeral 151 is a CPU I/F section.

In such a configuration, input of handwriting, etc., to an input panel is converted into input coordinate data by an input panel I/F section 61. This input coordinate data can be accessed through the CPU I/F section 151 from an external CPU or the like and is also fed into coordinate conversion means 62. The coordinate conversion means converts the input coordinates into display coordinates by a similar operation to the second embodiment described above. The resultant display coordinates can be accessed through the CPU I/F section 151 from an external CPU or the like and are also fed into recognition means 122. The recognition means 122 recognizes the display coordinates and outputs a character code by a similar operation as in the seventh embodiment described above.

Therefore, according to the tenth embodiment, the CPU I/F section controls the input panel I/F section, the coordinate conversion means, and the recognition means, whereby the input contents of the input panel can be recognized within a single LSI.

As described above, according to the embodiments of the invention, the CPU I/F section is shared by the input panel I/F section and display controller, whereby the input panel and display panel can be controlled by one display control LSI, facilitating miniaturization and saving of power. Further, the display control LSI is provided with coordinate conversion means, etc., for relieving CPU processing load. Additionally, an input path of handwriting, etc., can be displayed on the display panel without intervention of the CPU to reduce the overhead of processing such as data transfer to and from the CPU for displaying the input path at high speed.

What is claimed is:

1. A display control IC for connection to (i) an off-chip display for displaying an image, (ii) an off-chip input panel for outputting an input signal in response to an input position, and (iii) an off-chip processor, said display control IC comprising thereon:
   an input panel interface section responsive to the input signal from said off-chip input panel for providing input coordinate data indicating said input position in an input coordinate system used in said input panel;
   a processor interface section for controlling an access of said processor to said display controller to control said display controller and connected to said input panel interface section for controlling an access of said processor to said input panel interface section to read said input coordinate data; and
   a display controller connected with the input panel interface and the processor interface for controlling displays on said off-chip display under control of said off-chip processor.

2. The display control IC as claimed in claim 1 wherein
   said display controller controls display output onto said display by using a display coordinate system different from said input coordinate system;
   said display control IC further comprising coordinate conversion means for converting the input coordinate data provided by said input panel interface section into display coordinate data which is data in said display coordinate system; and wherein
   said processor interface section further controls an access of said processor to said coordinate conversion means to read said display coordinate data.

3. An information processing apparatus comprising:
   the display control IC as claimed in claim 2;
   a display where display is controlled by said display controller;
   an input panel for outputting an input signal in response to an input position to said input panel interface section; and
   a processor which accesses said display controller and said input panel through said processor interface section.

4. The display control IC as claimed in claim 1 wherein said display controller controls display output onto said display by using a display coordinate system different from said input coordinate system said display control IC further comprising:
   coordinate conversion means for converting the input coordinate data provided by said input panel interface section into display coordinate data which is data in said display coordinate system, said display controller displaying an image display on said off-chip display by using the display coordinate data output by said coordinate conversion means.

5. An information processing apparatus comprising:

the display control IC as claimed in claim 4;
a display where display is controlled by said display controller;
an input panel for outputting an input signal in response to an input position to said input panel interface section; and
a processor which accesses said display controller and said input panel through said processor interface section.

6. The display control IC as claimed in claim 1 wherein said display controller controls display output onto said display by using a display coordinate system different from said input coordinate system, said display control IC further comprising:
coordinate conversion means for converting the input coordinate data provided by said input panel interface section into display coordinate data which is data in said display coordinate system;
filtering processing means for applying filtering processing to the display coordinate data output by said coordinate conversion means, said display controller for displaying an image display on said display by using the filtering processed display coordinate data to which the filtering processing has been applied by said filtering processing means.

7. An information processing apparatus comprising:
the display control IC as claimed in claim 6;
a display where display is controlled by said display controller;
an input panel for outputting an input signal in response to an input position to said input panel interface section; and
a processor which accesses said display controller and said input panel through said processor interface section.

8. The display control IC as claimed in claim 1 further comprising recognition means responsive to the input coordinate data provided by said input panel interface section for recognizing a character input to the input panel and outputting recognition data indicating the recognized character, said display controller responsive to the recognition data output by said recognition means for displaying the character indicated by said recognition data on said display.

9. An information processing apparatus comprising:
the display control IC as claimed in claim 8;
a display where display is controlled by said display controller;
an input panel for outputting an input signal in response to an input position to said input panel interface section; and
a processor which accesses said display controller and said input panel through said processor interface section.

10. The display control IC as claimed in claim 1 further comprising:
recognition means responsive to the input coordinate data provided by said input panel interface section for recognizing a stroke of a drawn line input to the input panel and outputting recognition data indicating a class of the recognized stroke, said display controller having means responsive to the recognition data output by said recognition means for displaying on said display the drawn line having the stroke of the class indicated by said recognition data.

11. An information processing apparatus comprising:
the display control IC as claimed in claim 6;
a display where display is controlled by said display controller;
an input panel for outputting an input signal in response to an input position to said input panel interface section; and
a processor which accesses said display controller and said input panel through said processor interface section.

12. A display control IC connected to a display for displaying an image, an input panel for outputting an input signal in response to an input position, and a processor, said display control IC comprising:
a displaying controller which controls display on said display in response to control of said processor;
an input panel interface section responsive to the input signal from said input panel for providing input coordinate data indicating said input position in an input coordinate system used in said input panel;
a processor interface section for controlling access of said processor to said display controller to control said display controller and an access of said processor to said input panel interface section to read said input coordinate data; and
interrupt control means responsive to the input coordinate data provided by said input panel interface section for determining whether or not the input position to the input panel satisfies a predetermined condition, said interrupt control means issuing an interrupt signal to said processor if said predetermined condition is satisfied.

13. An information processing apparatus comprising:
the display control IC as claimed in claim 12;
a display where display is controlled by said display controller;
an input panel for outputting an input signal in response to an input position to said input panel interface section; and
a processor which accesses said display controller and said input panel through said processor interface section.

14. An information processing apparatus comprising:
a display for displaying an image;
an input panel for outputting an input signal in response to an input position;
a processor;
a display control IC including:
an on-chip display controller connected with the display for controlling images displayed on said display under control of said processor;
an on-chip input panel interface section connected with the input panel and responsive to the input signal from said input panel for providing input coordinate data indicating said input position in an input coordinate system used in said input panel; and,
an on-chip processor interface section connected with the processor and the on-chip display controller for controlling access of said processor to said display controller to control the display controller and connected with the on-chip input panel interface section for controlling access of said processor to said input panel interface section for reading said input coordinate data.

15. An input panel control IC connected to an input panel for outputting an input signal in response to an input position, said input panel control IC comprising:

an input panel interface section responsive to the input signal from the input panel for providing input coordinate data indicating the input position in an input coordinate system used in the input panel;

coordinate conversion means for converting the input coordinate data provided by said input panel interface section into data in a display coordinate system different from said input coordinate system;

filtering processing means for applying filtering processing to the display coordinate data output by said coordinate conversion means; and interrupt control means responsive to the input coordinate data provided by said input panel interface section for determining whether or not the input position to the input panel satisfies a predetermined condition, said interrupt control means issuing an interrupt signal to an external device when said predetermined condition is satisfied.

16. The input panel control IC as claimed in claim 15 further comprising:

recognition means responsive to the input coordinate data provided by said input panel interface section for recognizing the contents input to the input panel and outputting recognition data indicating the recognition result.

17. An input panel control IC for connection to an input panel for outputting an input signal in response to an input position, said input panel control IC comprising:

an input panel interface section responsive to the input signal from the input panel for providing input coordinate data indicating the input position in an input coordinate system used in the input panel;

coordinate conversion means for converting the input coordinate data provided by said input panel interface section into data in another coordinate system different from said input coordinate system; and interrupt control means responsive to the input coordinate data provided by said input panel interface section for determining whether the input position to the input panel satisfies a predetermined condition, said interrupt control means issuing an interrupt signal to an external device in response to said predetermined condition being satisfied.

* * * * *